US008730868B2

(12) United States Patent
Yamada et al.

(10) Patent No.: US 8,730,868 B2
(45) Date of Patent: May 20, 2014

(54) NETWORK NODE, TIME SYNCHRONIZATION METHOD AND NETWORK SYSTEM

(75) Inventors: Masaki Yamada, Yokohama (JP); Yuji Ogata, Saitama (JP); Nobuyuki Muranaka, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 164 days.

(21) Appl. No.: 13/401,086

(22) Filed: Feb. 21, 2012

(65) Prior Publication Data

US 2012/0250704 A1      Oct. 4, 2012

(30) Foreign Application Priority Data

Mar. 30, 2011   (JP) ................................. 2011-074217

(51) Int. Cl.
*H04B 7/212*     (2006.01)
*H04W 56/00*     (2009.01)

(52) U.S. Cl.
CPC ........ *H04W 56/0015* (2013.01); *H04W 56/001* (2013.01); *H04W 56/00* (2013.01)
USPC ....... 370/324; 370/395.62; 370/503; 370/507

(58) Field of Classification Search
CPC .......... H04W 56/0015; H04W 56/001; H04W 56/00
USPC ............... 37/324; 370/350, 395.62, 503, 507, 370/509, 510, 512, 513, 520
See application file for complete search history.

(56) References Cited

U.S. PATENT DOCUMENTS

| 8,125,279 | B2 | 2/2012 | Smiley |
| 2007/0081514 | A1 | 4/2007 | Shirokura et al. |
| 2010/0321122 | A1 | 12/2010 | Smiley |

FOREIGN PATENT DOCUMENTS

| JP | 3-102933 A | 4/1991 |
| JP | 2000-242618 A | 9/2000 |
| JP | 2002-94491 A | 3/2002 |
| JP | 2003-298630 A | 10/2003 |
| JP | 2004-199366 A | 7/2004 |
| JP | 2004-282441 A | 10/2004 |
| JP | 2008-109534 A | 5/2008 |
| JP | 2009-65579 A | 3/2009 |
| JP | 2010-288085 A | 12/2010 |
| JP | 2012-530410 A | 11/2012 |
| WO | WO 2006/001074 A1 | 1/2006 |
| WO | WO 2010/144995 A1 | 12/2010 |

*Primary Examiner* — Kwang B Yao
*Assistant Examiner* — Adam Duda
(74) *Attorney, Agent, or Firm* — Crowell & Moring LLP (57) ABSTRACT

In order to select a synchronization signal higher in accuracy, thereby increasing the accuracy of the time synchronization, it is provided a network node for transferring data in a network, comprising: a network interface having a plurality of ports; a transfer control module; a time synchronizing module; a fluctuation measurement module; and a clock. The time synchronization module uses a received time synchronization packet to synchronize the clock. The fluctuation measurement module determines an accuracy of a time contained in the received time synchronization packet based on a result of comparison between the time contained in the received time synchronization packet and a time of the clock.

17 Claims, 8 Drawing Sheets

| NODE IDENTIFICATION | NODE ADDRESS (IP ADRESS) | ALLOCATED TIME SYNCHRONIZATION MODULE | COUPLED PORT | SYNCHRONIZATION ACCURACY INFORMATION ($10^x$ µSEC) |
|---|---|---|---|---|
| 3B | 10.XX.XX.2 | A | 1-1 | 2 |
| 3F | 10.XX.XX.3 | B | 2-1 | 3 |
| 3X | 10.XX.XX.5 |  | 2-3 | 4 |
|  |  |  |  |  |

Fig. 8 ated to satisfy these requirements. One representative standard thereof is IEEE 1588 version 2, Precision Time Protocol (hereinafter, referred to as IEEE 1588 v2).
NETWORK NODE, TIME SYNCHRONIZATION METHOD AND NETWORK SYSTEM

CLAIM OF PRIORITY

The present application claims priority from Japanese patent application JP 2011-074217 filed on Mar. 30, 2011, the content of which is hereby incorporated by reference into this application.

BACKGROUND OF THE INVENTION

This invention relates to a computer network, and more particularly, to a technology for synchronizing a time of a device on a network One technology of synchronizing a device on a computer network is a method of using communication with a reference clock. Particularly, it is required for the time synchronization to be applied widely, to enable highly accurate synchronization, and to be inexpensive, and new methods have been standardized to satisfy these requirements. One representative standard thereof is IEEE 1588 version 2, Precision Time Protocol (hereinafter, referred to as IEEE 1588 v2).

According to IEEE 1588 v2, time synchronization is performed by measuring a delay on a communication path based on a difference in timestamp during communication, receiving a packet for notifying a time for synchronization, and considering the delay for the received time synchronization packet. According to IEEE 1588 v2, all network devices synchronize a time referring to one grandmaster clock provided on a network. On this occasion, a node having the highest clock accuracy is automatically selected as the grandmaster clock according to a protocol of IEEE 1588 v2.

Moreover, JP 2009-65579 A1 describes a method of synchronizing a time while considering paths on a network.

SUMMARY OF THE INVENTION

According to IEEE 1588 v2, a delay is measured on a communication path upon bidirectional periodical communication, and a time synchronization packet is transmitted and received. On this occasion, a path for synchronization is automatically determined, and hence a time synchronization packet higher in accuracy cannot be selected.

This invention has an object to select a synchronization signal higher in accuracy, thereby increasing the accuracy of the time synchronization.

The representative one of inventions disclosed in this application is outlined as follows. There is provided a network node for transferring data in a network, comprising: a network interface having a plurality of ports; a transfer control module; a time synchronizing module; a fluctuation measurement module; and a clock. The time synchronization module uses a received time synchronization packet to synchronize the clock. The fluctuation measurement module determines an accuracy of a time contained in the received time synchronization packet based on a result of comparison between the time contained in the received time synchronization packet and a time of the clock.

According to the representative embodiment of this invention, a node or a synchronization path having a synchronization signal higher in accuracy can be selected.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

First Embodiment

Figure 1:
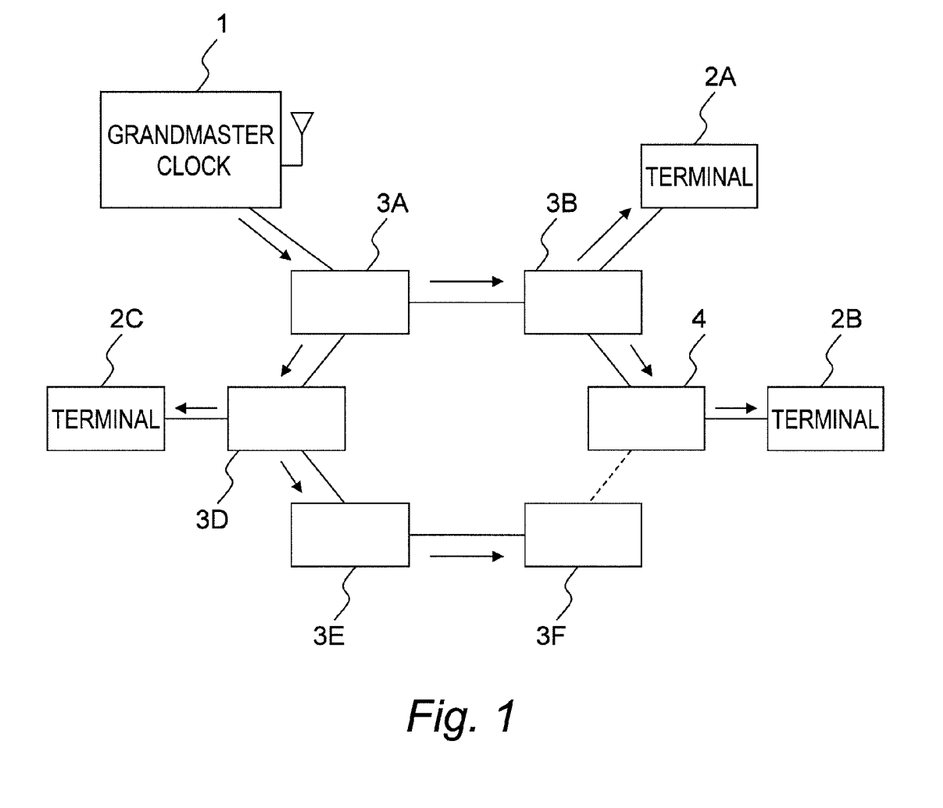
FIG. 1 is a block diagram illustrating a configuration of a network system according to a first embodiment of this invention.

FIG. 1 is a block diagram illustrating a configuration of a network system according to a first embodiment of this invention. A synchronization protocol is available on a network illustrated in FIG. 1.

A network system 10 according to the first embodiment includes a grandmaster clock 1, a plurality of terminals 2A-2D (hereinafter, sometimes collectively referred to as terminals 2), network nodes 3A-3F (hereinafter, sometimes collectively referred to as network nodes 3), and a network node 4, and these components are coupled via a network line.

The grandmaster clock 1 is a network node including a highly accurate clock for providing a time, and is a node having the most accurate clock in the network system 10. The highly accurate clock is realized by acquiring a time synchronized with an external time such as that of the GPS, or installing a highly accurate clock such as an atomic clock. The grandmaster clock 1 synchronizes a time with neighboring nodes including clocks by means of a time synchronization procedure of the synchronization protocol.

The terminal 2 is a network node coupled to the network, and can communicate via the network. When the terminal 2 includes a time synchronization function corresponding to the synchronization protocol, though the terminal 2 can synchronize time via the network, the time synchronization function of the terminal 2 is not essential according to this embodiment.

The network node 3 constitutes the network, and is a network device (such as a switch or a router) for transmitting communication over the network. Data transferred over the network is referred to as packet hereinafter. Although it is necessary for the network node 3 to have the time synchronization function corresponding to the synchronization protocol, a part of the nodes may not have the time synchronization function as long as a path for the time synchronization is established. The network node compliant to IEEE 1588 v2 includes a boundary clock and a transparent clock. The boundary clock itself includes a clock, and the transparent clock has a function to forward a synchronization signal. In this embodiment, a description is given of a case in which all the network nodes 3 are principally boundary clocks. A description is later given of influence of a case in which transparent clocks are included.

The network node 4 is a network node formed by improving a network node having a time synchronization function compliant to the synchronization protocol, and internally includes a clock as with the boundary clock. The network node 4 monitors the accuracy of the time synchronization, and tries to acquire a better synchronization accuracy by changing a path for the synchronization when the network node 4 determines that the synchronization accuracy is low.

The arrows in FIG. 1 represent flows of signals for the time synchronization. The time synchronization starts from the grandmaster clock 1, and reaches the terminals 2 via at least one of the network nodes 3A-3F. The network node 4 synchronizes a time with the network node 3B as a master. When the network node 4 receives the synchronization signal transmitted from the network node 3B on this occasion, the network node 4 corrects its own clock, and measures a correction amount (difference) of the clock. The network node 4 measures a fluctuation of the synchronization signal from the difference, and determines that the synchronization accuracy is low when the fluctuation is large.

When the network node 4 determines that the accuracy of the received synchronization signal is low, the network node 4 newly tries time synchronization with a node which can be a master for the network node 4 out of other neighboring network nodes 3A-3F. In the example illustrated in FIG. 1, the network node 4 ignores the synchronization signal transmitted from the network node 3B, and starts new synchronization with the network node 3F by using the synchronization signal from the network node 3F. Then, the network node 4 determines whether the synchronization accuracy is improved by the synchronization signal from the network node 3F.

Figure 2:
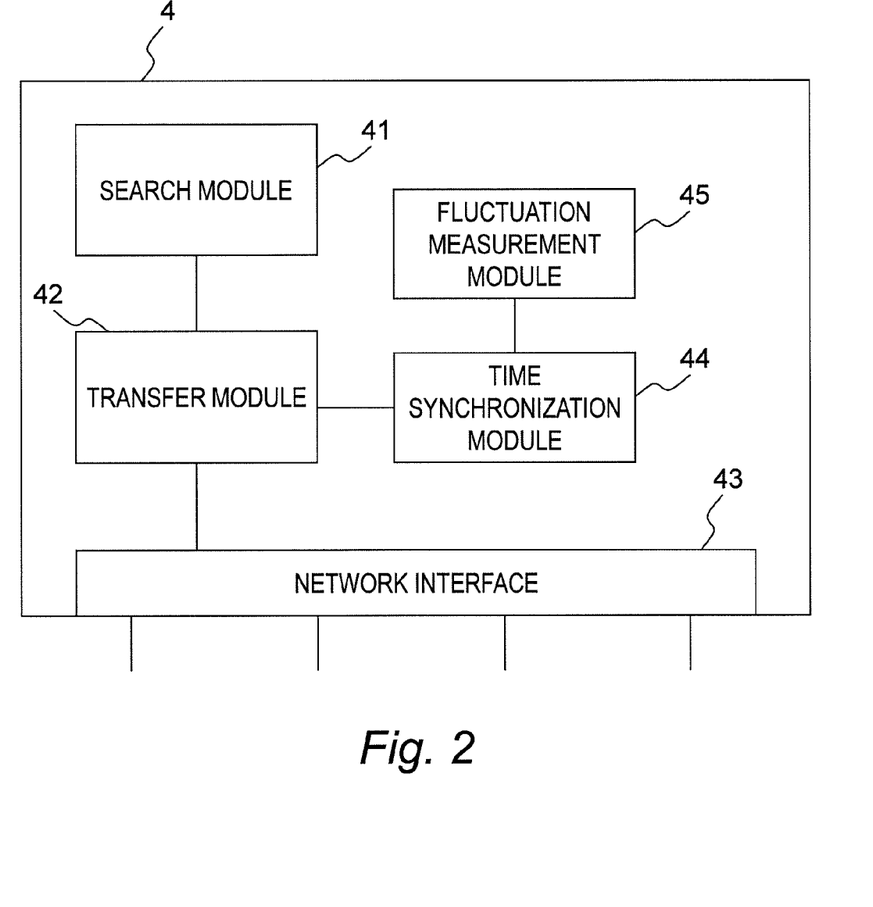
FIG. 2 is a block diagram illustrating a configuration of a network node according to the first embodiment of this invention.

FIG. 2 is a block diagram illustrating a configuration of the network node 4 according to the first embodiment.

The network node 4 includes a processor for executing programs, a memory for storing programs executed by the processor and data, and an interface coupled to the network, and includes a search module 41, a transfer module 42, a network interface module 43, a time synchronization module 44, and a fluctuation measurement module 45. The search module 41, the transfer module 42, the time synchronization module 44, and the fluctuation measurement module 45 are implemented by the processor executing predetermined programs, respectively. It should be noted that these configurations may be partially or entirely implemented by hardware logics or firmware.

The network interface module 43 receives a packet transmitted to the network node 4, and transmits the received packet to the transfer module 42. The transfer module 42 temporality stores the packet, and transmits a header portion of the packet to the search module 41. The search module 41 searches for a destination of the packet, and transmits a search result to the transfer module 42. When the transfer module 42 receives the search result from the search module 41, the transfer module 42 transfers the stored packet to a proper destination based on the received search result. On this occasion, when the packet is an ordinary data packet, the packet is transmitted via the network interface module 43 from a port corresponding to the destination to the network. On the other hand, when the packet is a packet for the synchronization, the packet is transferred to the time synchronization module 44.

The time synchronization module 44 includes a clock. The clock can be realized by a circuit for outputting time data, such as a real time clock. Moreover, the clock may be a crystal oscillator (such as a programmable oscillator) for outputting a signal at a constant cycle. Although the clock is provided inside the time synchronization module 44, the clock may be provided outside the time synchronization module 44. The time synchronization module 44 and the fluctuation measurement module 45 carry out time synchronization processing.

Figure 3:
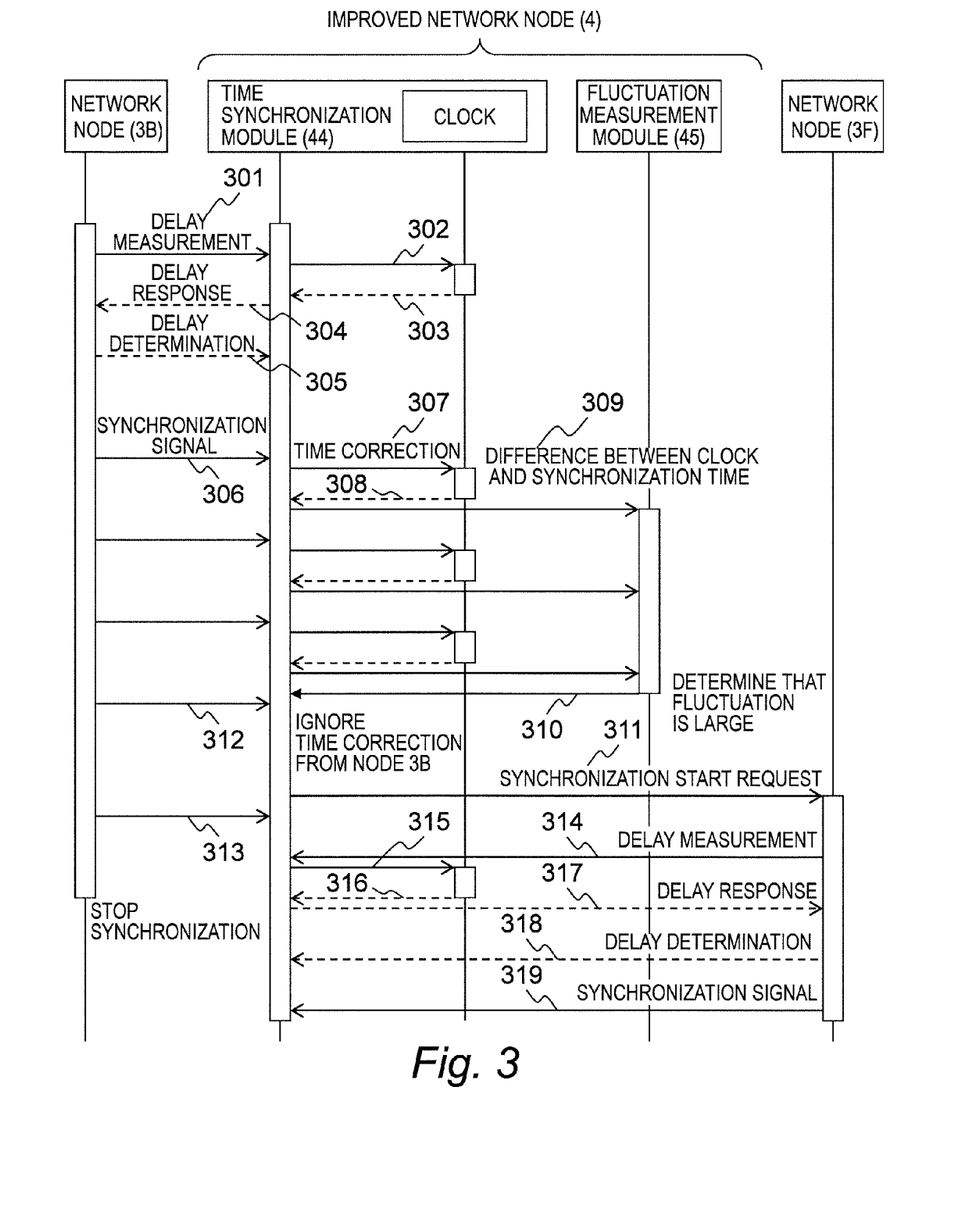
FIG. 3 is a sequence diagram of processing for a time synchronization packet according to the first embodiment of this invention.

FIG. 3 is a sequence diagram of processing for the time synchronization packet according to the first embodiment.

The network node 3B serving as a master transmits a delay measurement packet (Sync message) to the network node 4 serving as a slave (301). This delay measurement packet contains a current time T1 of the master node 3B. A Follow_up message may be transmitted in place of the Sync message as the delay measurement packet.

When the time synchronization module 44 receives the delay measurement packet from the master node 3B, the time synchronization module 44 inquires, of the clock, the time (302), and records a received time T2 of the delay measurement packet (303).

The time synchronization module 44 transmits a delay response packet (Delay_Req message) to the master node 3B (304). This delay response packet contains a time stamp T1 of the master node, a time stamp T2 of the slave node, and a current time (T3) of the slave node. A reception time of the delay response packet sets as T4.

When the master node 3B receives the delay response message, the master node 3B transmits a delay determination packet (Delay_Resp message) to the slave node 4 (305). This delay determination packet contains a transmission delay time $\Delta t$ between the master node 3B and the slave node 4. This transmission delay time is calculated according to $\Delta t=(T4-T3+T2-T1)/2$.

Then, the time synchronization module 44 carries out processing for the synchronization protocol. In other words, the master node 3B periodically transmits a synchronization signal (Sync message) to the salve node 4 (306). This synchronization signal contains a current time T5 of the master node 3B.

When the time synchronization module 44 receives the synchronization signal from the master node 3B, the time synchronization module 44 instructs the clock to correct the time (307). This time correction instruction contains a current time T5 of the master node 3B. The clock of the time synchronization module 44 corrects the time based on the time stamp T5 of the master node contained in the time correction instruction, synchronizes the time with the time of the master node, and notifies the time synchronization module 44 of a correction time (correction amount) (308). The time synchronization module 44 notifies the fluctuation measurement module 45 of the correction time of the clock each time the synchronization is performed with the master node (309).

After this time correction is repeated multiple times, the fluctuation measurement module 45 measures fluctuation of the received synchronization signal according to the correction times. As a result, when the fluctuation measurement module 45 determines that the fluctuation is large based on the measurement of the correction time for a predetermined period of time, the fluctuation measurement module 45 notifies the time synchronization module 44 of the large fluctuation (310).

An absolute value of a magnitude of the correction time, and a variation of the correction time (such as standard deviation), for example, may be used for the determination of the magnitude of the fluctuation. A large fluctuation is caused, first, by presence of a network node 3 lower in the clock accuracy than the network node 4 on a path on which the synchronization signal is transferred, and, second, by a congested state of the network node 3 due to a received large amount of traffic, for example.

When the time synchronization module 44 receives the notification of "large fluctuation" from the fluctuation measurement module 45, the time synchronization module 44 determines whether or not there is a network node whose current relationship with the network node 4 is not a master or a slave. The network node 3F in the example illustrated in FIG. 1 is not a master or slave of the network node 4, and the network node 4 is not synchronized with the network node 3F.

The time synchronization module 44 requests the network node 3F to carry out the time synchronization (311), and ignores the synchronization signal 312 from the network node 3D with which the time has been synchronized. As a result, new synchronization via the network node 3F starts, and the time synchronization with the network node 3D, the synchronization signal from which is ignored, stops due to a timeout of the synchronization signal 313.

When the network node 3F receives a request for the time synchronization, the network node 3F transmits a delay measurement packet to the network node 4 (314). The time synchronization module 44 inquires, of the clock, the time (315), and records a reception time T2 of the delay measurement packet (316). The time synchronization module 44 transmits a delay response packet to the master node 3F (317). The master node 3F transmits a delay determination packet to the slave node 4 (318).

The time synchronization sequence by means of the delay measurement packet, the delay response packet, and the delay determination packet is the same as the sequence 301-305 described above between the master node 3B and the slave node 4.

Then, the network node 3F, which has become the new master, transmits the synchronization signal to the slave node 4 (319).

Further, when there is a network node to be a slave node of the network node 4, the network node 4 generates the synchronization signal intended for the slave node by using the synchronized clock, and transmits the generated synchronization signal in accordance with the time synchronization protocol.

Figure 4:
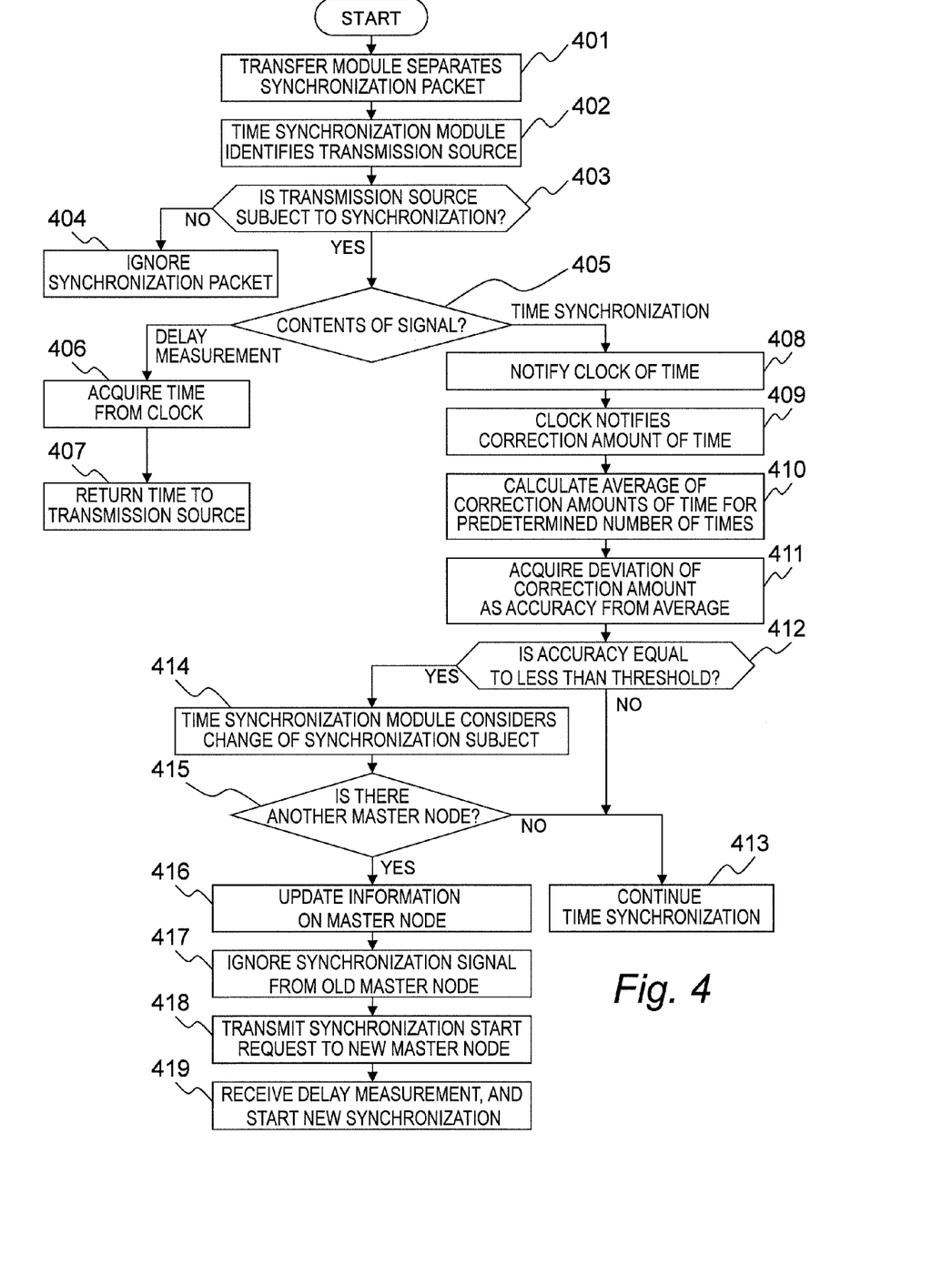
FIG. 4 is a flowchart of the processing for the time synchronization packet according to the first embodiment of this invention.

FIG. 4 is a flowchart of the processing for the time synchronization packet according to the first embodiment. This time synchronization processing is carried out by the processor of the network node 4 executing a predetermined program.

First, the transfer module 42 separates the received synchronization packet, and transmits the separated synchronization packet to the time synchronization module 44 (401).

The time synchronization module 44 analyzes the separated synchronization packet, thereby identifying a transmission source of the received synchronization packet (402). As a result, when the transmission source of the received packet is not the node to be subjected to synchronization (No in 403), the time synchronization module 44 ignores the received synchronization packet (404).

On the other hand, the transmission source of the received synchronization packet is the node to be subjected to the synchronization (YES in 403), the time synchronization module 44 determines contents of the received synchronization packet (405).

When the received synchronization packet is a delay measurement packet, the time synchronization module 44 acquires the time from the clock (406), and returns a delay response packet containing the time acquired from the clock to the master node 3B of the transmission source (407).

On the other hand, when the received synchronization packet is the synchronization signal (time synchronization packet), the time synchronization module 44 notifies the clock of the time contained in the received synchronization signal, thereby correcting the time of the clock (408). Then, the clock notifies the time synchronization module 44 of the correction amount of the time (409).

The time synchronization module 44 calculates the average of a predetermined number of the correction amounts of the time notified from the clock (410), and acquires the deviation of the correction amounts from the calculated average (411). In the time synchronization processing according to this embodiment, the deviation acquired from the average of the correction amounts is considered as the accuracy, but a result of another statistical processing representing a variation of the correction amounts can be used.

Then, the fluctuation measurement module 45 compares the calculated accuracy and the predetermined threshold with each other (412). As a result, when the accuracy is higher than the predetermined threshold, the predetermined time accuracy can be secured by the time synchronization with the current master node, and hence the fluctuation measurement module 45 determines to continue the time synchronization with the current master node (413).

On the other hand, when the accuracy is less than the predetermined threshold, the predetermined time accuracy cannot be secured by the time synchronization with the current master node, and the fluctuation measurement module 45 considers a change of the master node with which the time is to be synchronized (414). Therefore, the fluctuation measurement module 45 first determines whether or not there is another master node (415).

When the fluctuation measurement module 45 cannot receive a synchronization signal transmitted from a node other than the current master node, there is no other master node, and the fluctuation measurement module 45 continues the time synchronization with the current master node (413).

On the other hand, when the fluctuation measurement module 45 can receive a synchronization signal transmitted from a node other than the current master node, there is another master node, and hence the fluctuation measurement module 45 updates the information on the master node to be synchronized with (416), and the time synchronization module 44 ignores the synchronization signal transmitted from the old master node (417). Then, the fluctuation measurement module 45 transmits a synchronization start request to the new master node (418), and receives the delay measurement packet from the new master node, and the new synchronization starts (419).

According to the first embodiment, the master node is selected by using the accuracy of the time contained in the synchronization signal, but a transfer path for the synchronization signal transmitted from the same master node may be selected in accordance with the same sequence of steps. In other words, the delay amount and the fluctuation thereof are different depending on the transfer path for the synchronization signal transmitted from the same master node. Therefore, the accuracies of the synchronization signal received via certain ports are calculated, and the port for receiving the synchronization port is changed based on the calculated accuracies.

Moreover, the transfer module 42 may measure packet transfer amounts for the respective ports of the network interface module 43, and the time synchronization module 44 may switch the node of the synchronization source when congestion is detected.

As described above, according to the first embodiment, the deviation of the correction amounts for the clock, which is acquired by means of the synchronization signal transmitted from a host network node, is used for monitoring the accuracy of the time synchronization, and a synchronization signal transmitted from another node, or via another synchronization path is selected when the accuracy of the time synchronization is low, thereby selecting a synchronization signal higher in accuracy.

Moreover, extensive, autonomous, inexpensive, and highly accurate time synchronization can be realized on a network using the protocol compliant with IEEE 1588 v2.

Second Embodiment

A description is now given of a second embodiment of this invention.

The network node 4 according to the second embodiment is different from the network node according to the first embodiment described above, and includes two time synchronization modules respectively synchronized in time with different nodes. In this embodiment, a description is given of an example in which the network node includes two time synchronization modules, but the network node may include three or more time synchronization modules.

Figure 5:
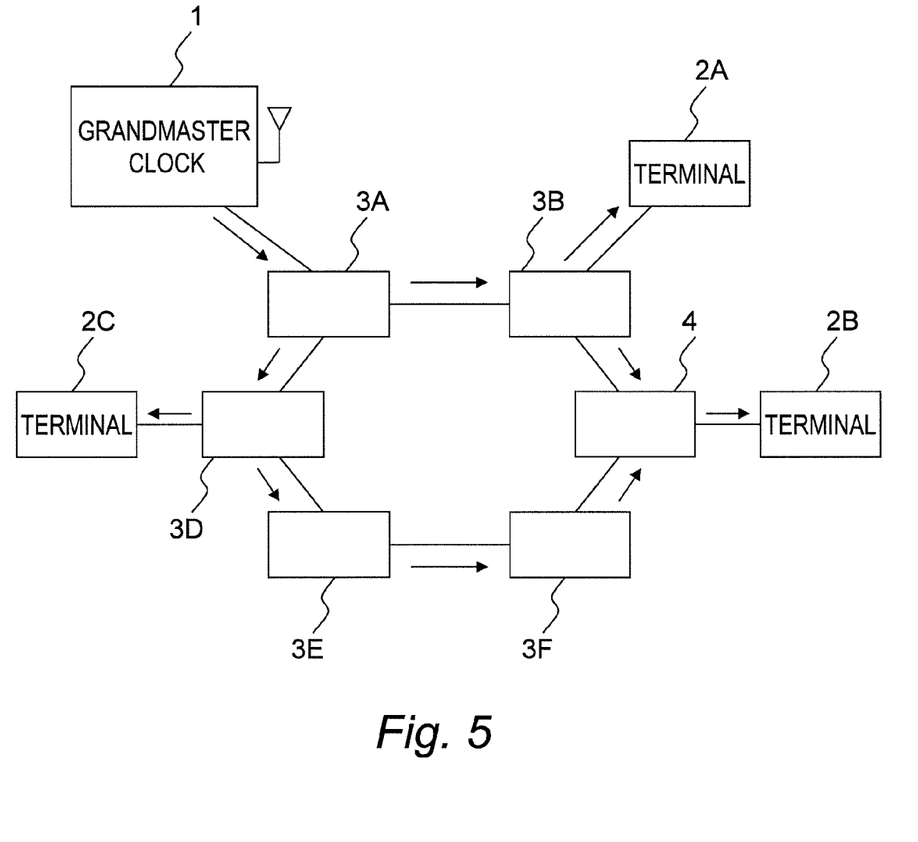
FIG. 5 is a block diagram illustrating a configuration of a network system according to a second embodiment of this invention.

FIG. 5 is a block diagram illustrating a configuration of a network system according to the second embodiment of this invention. A synchronization protocol is available on a network illustrated in FIG. 5. In the second embodiment, the same components as those of the first embodiment described above are denoted by the same reference symbols, and the description thereof is omitted.

A network system 10 according to the second embodiment includes the grandmaster clock 1, the plurality of terminals 2A-2D, the network nodes 3A-3F, and the network node 4, and these components are coupled via a network line.

The network node 4 is a network node formed by improving a network node having a time synchronization function compliant to the synchronization protocol, and internally includes a clock as with the boundary clock. The network node 4 internally includes a plurality of clocks for synchronization, enables synchronization from a plurality of paths, and has a function of comparing the synchronization accuracies from the plurality of paths, thereby selecting an optimum synchronization path.

In FIG. 5, when the network node 4 receives the synchronization signal transmitted from the network node 3B, the network node 4 corrects the clock, and measures a correction amount (difference) of the clock. The network node 4 measures the fluctuation of the synchronization signal from the difference. Moreover, when the network node 4 receives the synchronization signal transmitted from the network node 3F, the network node 4 measures the difference from the clock without correcting the clock. The network node 4 measures the fluctuation of the synchronization signal from the difference.

When the fluctuations of the synchronization signals transmitted from the network nodes 3B and 3F are large, the network node 4 switches the master node in order to synchronize with a network node which transmits a synchronization signal high in accuracy as the master. In other words, when the network node 4 determines that the accuracy of the received synchronization signal is low, the network node 4 synchronizes the time with a node, as a master, which can be a master for the network node 4 out of other neighboring network nodes 3A-3F. In the example illustrated in FIG. 5, the network node 4 uses the signal from the clock to thereby synchronize the time with the network node 3B as the master, and also synchronizes the time with the network node 3F. Then, when the synchronization signal from the network node 3F is higher in accuracy than the synchronization signal from the network node 3B, the network node 4 switches the master node, thereby synchronizing the clock with the network node 3F as the master. On this occasion, the network node 4 searches for a neighboring network node with which the time can be synchronized.

Figure 6:
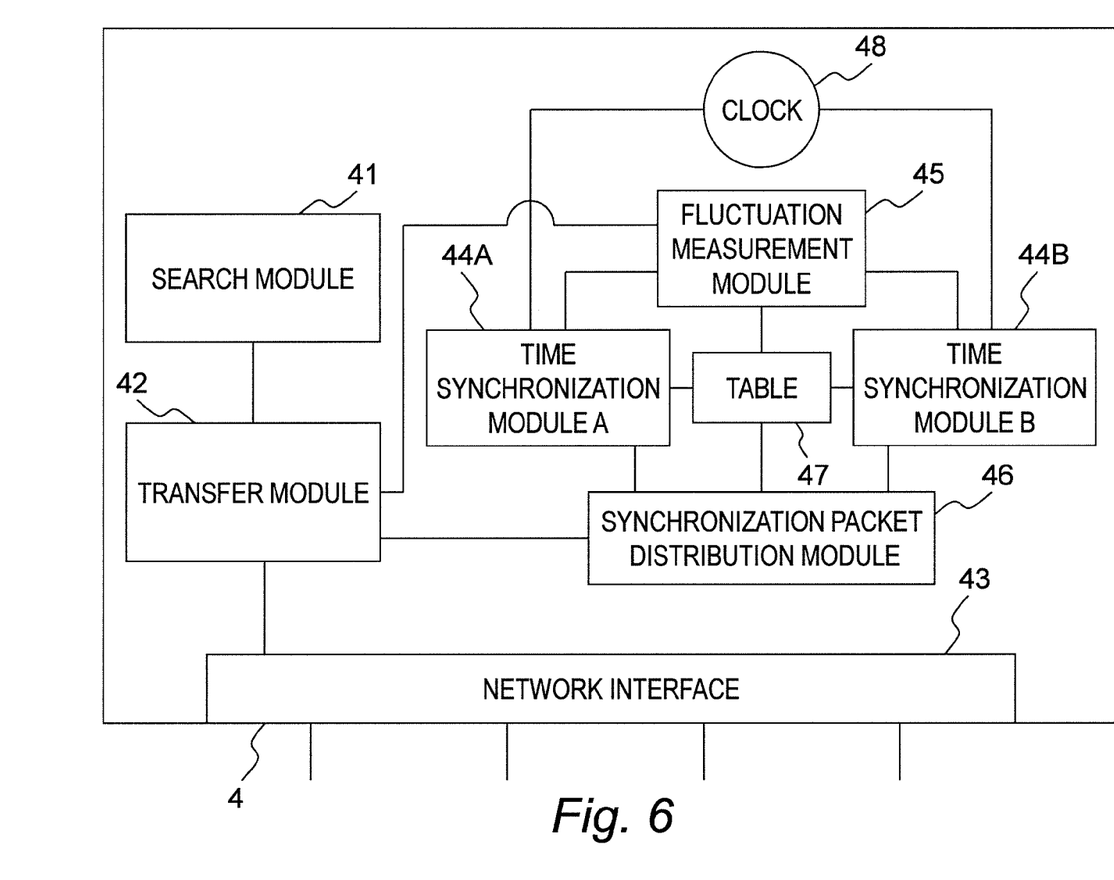
FIG. 6 is a block diagram illustrating a configuration of a network node according to the second embodiment of this invention.

FIG. 6 is a block diagram illustrating a configuration of the network node 4 according to the second embodiment.

The network node 4 includes a processor for executing programs, a memory for storing programs executed by the processor and data, and an interface coupled to the network, and includes a search module 41, a transfer module 42, a network interface module 43, a time synchronization module A (44A) and a time synchronization module B (44B) (hereinafter, sometimes collectively referred to as time synchronization modules 44), a fluctuation measurement module 45, a synchronization packet distribution module 46, a table 47, and a clock 48.

The search module 41, the transfer module 42, the time synchronization module 44A and 44B, the fluctuation measurement module 45, and the synchronization packet distribution module 46 are implemented by the processor executing predetermined programs, respectively. It should be noted that these configurations may be implemented partially or entirely by hardware logics or firmware. The clock 48 can be realized by a circuit for outputting time data, such as a real time clock. Moreover, the clock may be a crystal oscillator (such as a programmable oscillator) outputting a signal at a constant cycle.

Figure 7:
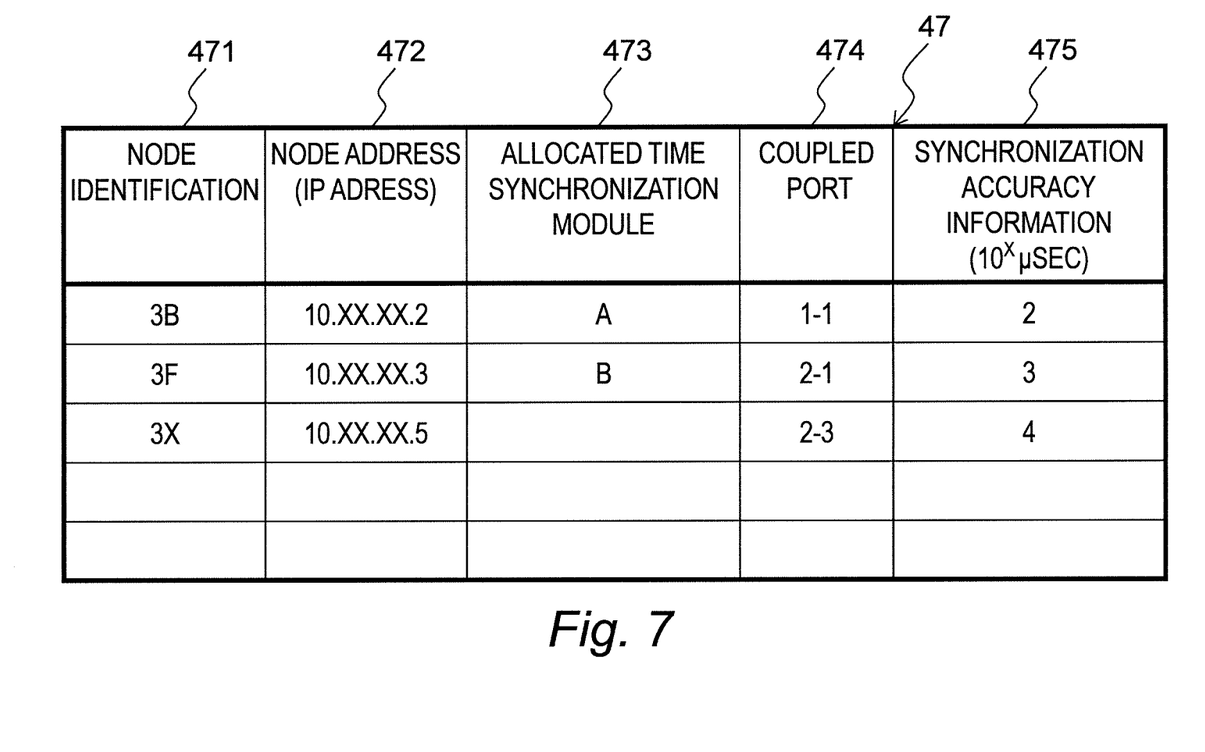
FIG. 7 is a explanatory diagram illustrating a configuration of a table according to the second embodiment of this invention.

As illustrated in FIG. 7, the table 47 includes node identifiers 471, node addresses 472, allocated time synchronization modules 473, coupled ports 474, and synchronization accuracy information 475.

The node identifier 471 is an identifier of a network node which can serve as a master. The node address 472 is an address of the network node identified by the node identifier 471, and an IP address may be used as the node address 472, for example. The allocated time synchronization module 473 is an identifier of a time synchronization module for processing the synchronization signal of the network node identified by the node identifier 471. The coupled port 474 is an identifier of a port to which the network node identified by the node identifier 471 is coupled. The synchronization accuracy information 475 is the accuracy of the synchronization signal transmitted from the network node identified by the node identifier 471.

The network interface module 43 receives a packet transmitted to the network node 4, and transmits the received packet to the transfer module 42. The transfer module 42 temporality stores the packet, and transmits a header portion of the packet to the search module 41. The search module 41 searches for a destination of the packet, and transmits a search result to the transfer module 42. When the transfer module 42 receives the search result from the search module 41, the transfer module 42 transfers the stored packet to a proper destination based on the received search result. On this occasion, when the packet is an ordinary data packet, the packet is transmitted via the network interface module 43 from a port corresponding to the destination to the network. On the other hand, when the packet is the synchronization signal, the packet is transferred to the synchronization packet distribution module 46. The synchronization packet distribution module 46 refers to the transmission source and the transmission path information of the synchronization signal transferred from the transfer module 42, thereby selecting a time synchronization module of the transfer destination of the packet (in other words, whether to transfer the packet to a time synchronization module A (44A), or to a time synchronization module B (44B), or to discard). In other words, the synchronization packet distribution module 46 refers to the table 47, thereby transferring the synchronization signal received from each node to the time synchronization module A (44A) or the time synchronization module B (44B).

The time synchronization module A (44A) and the time synchronization module B (44B) respectively synchronize the times using the synchronization signals from the allocated nodes. However, only the time from one of the time synchronization modules from which an excellent accuracy is obtained is used for the actual synchronization of the time. Then, the time synchronization module A (44A) and the time synchronization module B (44B) calculate correction amounts (differences) of the time, measure fluctuations of the synchronization signals from the differences, and transmit information on the measured fluctuations to the fluctuation measurement module 45.

The fluctuation measurement module 45 compares the synchronization accuracies of the two time synchronization modules 44A and 44B with each other, thereby determining excellence of the synchronization accuracy. As a result of the determination, when the accuracy of the synchronization signal from the current master node is worse than the accuracy of the synchronization signal from the other network node, the master node is switched, and the other network node is considered as the master, and the clock 48 is synchronized with the other network node.

According to the second embodiment, the master node is selected by using the accuracy of the time contained in the synchronization signal, but a transfer path for the synchronization signal transmitted from the same master node may be selected in accordance with the same sequence of steps. In other words, the accuracy of the synchronization signal received via each port is calculated, and a port for receiving the synchronization port is changed based on the calculated accuracy.

Moreover, as described above, the transfer module 42 may measure packet transfer amounts for the respective ports of the network interface module 43, and the time synchronization module 44 may switch the node of the synchronization source when congestion is detected.

As described above, according to the second embodiment, in addition to the effects of the first embodiment, the network node has a plurality of time synchronization modules, and hence the other time synchronization module 44B can search for a node or a path having a high accuracy out of a plurality of nodes (paths of synchronization signal) while the one time synchronization module 44A is mainly operating. As a result, before switching, it is possible to know the quality of the synchronization signal after switching, and then to determine whether to carry out the switching.

Third Embodiment

A description is now given of a third embodiment of this invention.

The network node 4 according to the third embodiment is different from the network node according to the second embodiment, and includes two clocks for providing times to respective time synchronization modules. In the third embodiment, the same components as those of the first and second embodiments are denoted by the same reference symbols, and description thereof is omitted.

Figure 8:
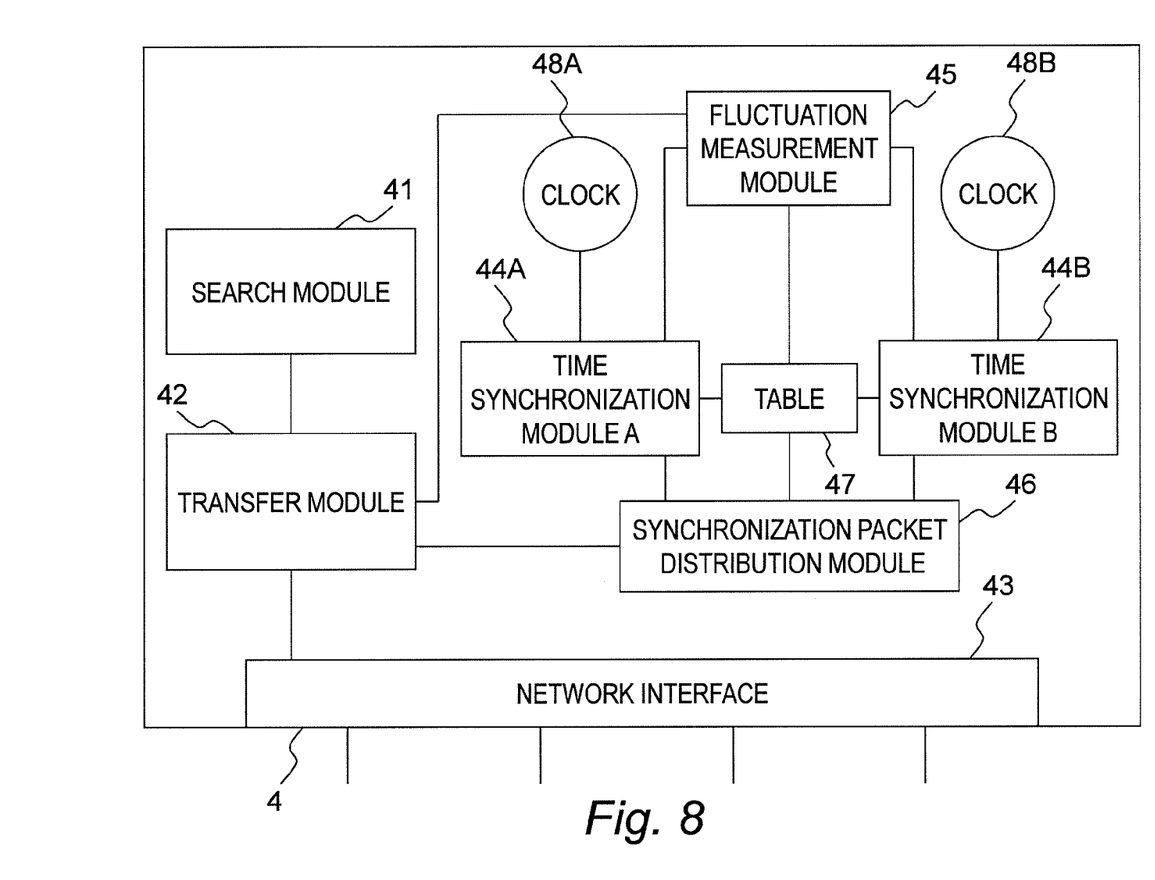
FIG. 8 is a block diagram illustrating a configuration of a network node according to the third embodiment of this invention.

FIG. 8 is a block diagram illustrating a configuration of the network node 4 according to the third embodiment.

The network node 4 includes a processor for executing programs, a memory for storing programs executed by the processor and data, and an interface coupled to the network, and includes a search module 41, a transfer module 42, a network interface module 43, a time synchronization module A (44A), a time synchronization module B (44B), a fluctuation measurement module 45, a synchronization packet distribution module 46, a table 47, and clocks 48A and 48B.

The search module 41, the transfer module 42, the time synchronization modules 44A and 44B, the fluctuation measurement module 45, and the synchronization packet distribution module 46 are implemented by the processor executing predetermined programs, respectively. It should be noted that these configurations may be implemented partially or entirely by hardware logics or firmware. The clocks 48A and 48B are respectively controlled by the time synchronization module A (44A) and time synchronization module B (44B). The clocks 48A and 48B can be realized by circuits for outputting time data, such as real time clocks. Moreover, each of the clocks may be a crystal oscillator (such as a programmable oscillator) outputting a signal at a constant cycle. The clocks are provided outside the time synchronization modules 44A and 44B, but the clocks may be provided inside the time synchronization modules 44A and 44B.

The time synchronization module A (44A) and the time synchronization module B (44B) synchronize the times of the corresponding clocks 48A and 48B, respectively, using the synchronization signals transmitted from the allocated nodes. Then, the time synchronization module A (44A) and the time synchronization module B (44B) calculate correction amounts (differences) of the time, calculate fluctuations of the synchronization signals from the differences, and transmit information on the measured fluctuations to the fluctuation measurement module 45.

The fluctuation measurement module 45 compares the synchronization accuracies of the two time synchronization modules 44A and 44B, selects a synchronization time having the smaller fluctuation as a time to be employed, and notifies the allocated time synchronization module 44 of the selected time. The selected time synchronization module 44 generates the synchronization signal to be transmitted to the subordinate terminal 2B.

Moreover, as a result of the determination, when the accuracy of the synchronization signal from the current master node is lower than the accuracy of the synchronization signal from another network node, the fluctuation measurement module 45 switches the master node. During this switching, the time synchronization module, which is not synchronized with the master node, searches for another neighboring node with which the time can be synchronized.

As described above, according to the third embodiment, in addition to the effects of the first and second embodiments, the processing in the fluctuation measurement module 45 can be simplified.

MODIFIED EXAMPLE

It should be noted that the first to third embodiments can be applied to the synchronization protocol compliant to IEEE 1588 v2, which synchronizes a time with those of neighboring nodes, thereby gradually extending the extent of the synchronization. Further, the embodiments can be operated in a mixture of devices compliant to the time synchronization method according to the embodiments of this invention and devices adapted to the ordinary synchronization protocol compliant to IEEE 1588 v2. On the other hand, for the conventional time synchronization protocol which requires the time synchronization in a server/client configuration in which a time synchronization server is provided, intermediate relay nodes do not carry out the time synchronization, and the synchronization cannot be intentionally established via a different path.

In the above-mentioned embodiments, the network nodes 3 operate as boundary clocks, but the time synchronization according to this invention can be applied to a case where some of the network nodes 3 are transparent clocks. In this case, the transparent clocks are treated transparently, and a time is synchronized with a neighboring boundary clock by means of the synchronization protocol. When both the network node 3B and the network node 3F according to the first embodiment (FIG. 1) are transparent clocks, for example, network nodes which the time synchronization module 44 can select as a master node are the network nodes 3A and 3E.

Further, when the network nodes 3D and 3E are also transparent clocks, a boundary clock (master node) neighboring the network node 4 is the network node 3A regardless of whether any one of the two paths is selected. In this case, in order to distinguish the two paths, for identifying the path, the time synchronization module 44 preferably receives, in addition to the destination information such as an IP address, information on a port for receiving the synchronization signal, and on the MAC address of a network node on the opposite side from the transfer module 42, thereby identifying and blocking a synchronization signal transferred on a path low in accuracy.

While the present invention has been described in detail and pictorially in the accompanying drawings, the present invention is not limited to such detail but covers various obvious modifications and equivalent arrangements, which fall within the purview of the appended claims.

What is claimed is:

1. A network node for transferring data in a network, comprising:
    a network interface having a plurality of ports;
    a transfer control module;
    a time synchronizing module;
    a fluctuation measurement module; and
    a clock, wherein:
    the time synchronization module uses a received time synchronization packet to synchronize the clock;
    the fluctuation measurement module determines an accuracy of a time contained in the received time synchronization packet based on a result of comparison between the time contained in the received time synchronization packet and a time of the clock;
    the time synchronization module is configured to:
        correct the time of the clock with the time contained in the received time synchronization packet, and
        obtain a correction amount of the time of the clock;
    the fluctuation measurement module is configured to:
        determine whether a network node of a synchronization source is to be changed based on a result of comparison between a result of statistically processing the correction amount obtained by the time synchronization module and a predetermined threshold, and
        determine whether there is another network node of a synchronization source depending on whether a time synchronization packet transmitted from a network node other than a current synchronization source is received; and
    the time synchronization module ignores a synchronization signal transmitted from the network node of the current synchronization source, and starts processing for synchronization with a network node of a new synchronization source based on results of the determinations by the fluctuation measurement module.

2. The network node according to claim 1, wherein the time synchronization module selects another network node which is a transmission source of the time synchronization packet for synchronizing the clock and is a synchronization source based on the determined accuracy of the time.

3. The network node according to claim 1, wherein the time synchronization module selects a transfer path of the time synchronization packet for synchronizing the clock based on the determined accuracy of the time.

4. The network node according to claim 1, wherein:
    the time synchronization module compares the time contained in the received time synchronization packet with the time of the clock; and
    the fluctuation measurement module determines the accuracy of the time contained in the received time synchronization packet based on a fluctuation of a result of the comparison.

5. The network node according to claim 1, wherein:
    the time synchronization module includes at least a first time synchronization module and a second time synchronization module;
    the first time synchronization module and the second time synchronization module respectively receive the time synchronization packets transmitted from different network nodes, or transmitted via different paths from a same another network node; and
    the fluctuation measurement module determines the accuracy of the time contained in the received time synchronization packet.

6. The network node according to claim 5, wherein:
    the clock includes a first clock and a second clock;
    the first time synchronization module synchronizes the first clock; and
    the second time synchronization module synchronizes the second clock.

7. The network node according to claim 5, wherein the first time synchronization module and the second time synchronization module respectively receive the time synchronization packets transferred from different network nodes via different paths.

8. The network node according to claim 5, wherein the time synchronization module generates a time synchronization packet to be transmitted to a downstream network node in a case where the clock is synchronized with a time synchronization packet for which the determined accuracy of the time is high.

9. A time synchronization method in a network node for transferring data in a network,
    the network node including a network interface having a plurality of ports, a transfer control module, a time synchronizing module, a fluctuation measurement module, and a clock,
    the time synchronization method including the steps of:
    synchronizing, by the time synchronization module, the clock by using a received time synchronization packet;
    monitoring, by the time synchronization module, a result of the synchronizing; and
    determining, by the fluctuation measurement module, an accuracy of a time contained in the received time synchronization packet based on a result of comparison between the time contained in the received time synchronization packet and a time of the clock, wherein:

in the step of synchronizing of the clock, the time synchronization module corrects the time of the clock with the time contained in the received time synchronization packet;

in the step of monitoring of the result of the synchronizing, the time synchronization module obtains a correction amount of the time of the clock; and the step of determining of the accuracy of the time includes the steps of:
- determining, by the fluctuation measurement module, whether a network node of a synchronization source is to be changed based on a result of comparison between a result of statistically processing the correction amount obtained by the time synchronization module and a predetermined threshold;
- determining, by the fluctuation measurement module, whether there is another network node of a synchronization source depending on whether a time synchronization packet transmitted from a network node other than a current synchronization source is received; and
- ignoring, by the time synchronization module, a synchronization signal transmitted from the network node of the current synchronization source, and starting processing for synchronization with a network node of a new synchronization source based on results of the determining steps by the fluctuation measurement module.

10. The time synchronization method according to claim 9, further including the step of selecting, by the time synchronization module, another network node which is a transmission source of the time synchronization packet for synchronizing the clock and is a synchronization source based on the determined accuracy of the time.

11. The time synchronization method according to claim 9, further comprising selecting, by the time synchronization module, a transfer path of the time synchronization packet for synchronizing the clock based on the determined accuracy of the time.

12. The time synchronization method according to claim 9, wherein:
in the step of synchronizing of the clock, the time synchronization module compares the time contained in the received time synchronization packet with the time of the clock; and
in the step of determining of the accuracy, the fluctuation measurement module determines the accuracy of the time contained in the received time synchronization packet based on a fluctuation of a result of the comparing.

13. The time synchronization method according to claim 9, wherein:
the time synchronization module includes at least a first time synchronization module and a second time synchronization module;
the first time synchronization module and the second time synchronization module respectively receive the time synchronization packets transmitted from different network nodes, or transmitted via different paths from a same another network node; and
the fluctuation measurement module determine the accuracy of the time contained in the received time synchronization packet.

14. The time synchronization method according to claim 13, wherein:
the clock includes a first clock and a second clock;
the first time synchronization module synchronizes the first clock; and
the second time synchronization module synchronizes the second clock.

15. The time synchronization method according to claim 13, wherein the first time synchronization module and the second time synchronization module respectively receive the time synchronization packets transferred from different network nodes via different paths.

16. The time synchronization method according to claim 13, wherein the time synchronization module generates a time synchronization packet to be transmitted to a downstream network node in a case where the clock is synchronized with a time synchronization packet for which the determined accuracy of the time is high.

17. A network system, comprising:
a plurality of network nodes for transferring data in the network system; and
a grandmaster clock for providing an inside the network system with a time wherein
the plurality of network nodes includes at least a first network node, a second network node, a third network node, and a fourth network node,
each of the plurality of network nodes includes a network interface having a plurality of ports, a transfer control module, a time synchronizing module, a fluctuation measurement module, and a clock, and
the first network node is configured to:
receive a time synchronization packet from the second network node;
synchronize the clock based on the received time synchronization packet;
determine an accuracy of a time contained in the time synchronization packet transmitted from the second network node based on a result of comparison between the time contained in the received time synchronization packet and a time of the clock;
change a network node of a synchronization source to the third network node in a case where the first network node determines that the accuracy of the time is low; and
generate a time synchronization packet to be transmitted to the fourth network node based on a signal from the clock after synchronizing the clock with a time synchronization packet transmitted from the third network node.

* * * * *